United States Patent [19]
Beyer et al.

[11] 3,890,137
[45] June 17, 1975

[54] WELDING POWDER FOR PRODUCING WEAR-RESISTANT LAYERS BY BUILD-UP WELDING

[75] Inventors: Horst Beyer; Ulrich Buran, both of Burscheid, Germany

[73] Assignee: Goetzewerke-Friedrich Goetze AG, Burscheid, Germany

[22] Filed: Mar. 15, 1974

[21] Appl. No.: 451,678

[30] Foreign Application Priority Data
Mar. 15, 1973 Germany.............................. 2312810

[52] U.S. Cl. ............... 75/.5 BB; 75/.5 BC; 75/.5 R; 75/176
[51] Int. Cl............................ C22c 1/05; C22c 27/00
[58] Field of Search .............. 75/.5 R, .5 BB, .5 AB, 75/.5 AC, .5 BC, .5 C, 176; 29/199 C, 199 Y; 117/106 A, 105.2

[56] References Cited
UNITED STATES PATENTS

| | | | |
|---|---|---|---|
| 2,987,390 | 6/1961 | McCawley | 75/.5 BB |
| 3,407,057 | 10/1968 | Timmons | 75/.5 BB |
| 3,690,686 | 9/1972 | Prasse | 29/191.2 X |
| 3,784,369 | 1/1974 | Svanstrom | 75/.5 BB |

*Primary Examiner*—L. Dewayne Rutledge
*Assistant Examiner*—Arthur J. Steiner
*Attorney, Agent, or Firm*—Spencer & Kaye

[57] ABSTRACT

A welding powder contains a first component selected from the group consisting of molybdenum, tungsten, and a mixture of these two metals and a second component of at least one element selected from the group consisting of oxygen, nitrogen, hydrogen and carbon. The second component of oxygen, nitrogen, hydrogen or carbon is present in the metal of the welding powder partly in an unbound, dissolved state.

13 Claims, No Drawings

WELDING POWDER FOR PRODUCING WEAR-RESISTANT LAYERS BY BUILD-UP WELDING

BACKGROUND OF THE INVENTION

The present invention relates to an alloying powder or a powder mixture, respectively, for producing wear-resistant layers by fusion-deposition welding processes, otherwise known as hard-facing or build-up welding.

Surfaces of machine parts subjected to wear are protected in known processes by reinforcement with wear-resistant layers. Such coating processes include, for example, thermal spraying, electrolytic coating, electrostatic deposition, deposition from the vapor phase and build-up welding.

In build-up welding, hard surfacing materials are widely used for applying a hard surface to a base or parent material to protect the base material from abrasive wear or to provide a cutting surface thereon. A widely used type of such hard surfacing material incorporates hard particles such as refractory carbides within a tube of metal. The tube functions to support the refractory carbides, alloy with the final deposit and in some cases, as in the case of electric arc welding, act as the electro-conductive material. The hard surfacing is deposited from such rods and electrodes by thermal fusion through the use of a high temperature gas flame, an electric arc or a similar source of heat. Depending on the source of heat, the tube is characterized as a welding rod or as both a welding rod and an electrode (e.g. gas flame and electric arc, respectively).

Welding rods and electrodes have been formed by placing carbide particles within a metal tube or within a strip of metal which is formed into a tube. Mild or low carbon steel strip has been employed as a tube material. In addition to the carbide particles, small amounts of other materials such as deoxidizers, alloying agents and binder materials have been placed within the metal tube in order to vary the properties of the ultimate deposit that is formed. The sum of the ingredients within the tube are generally called filler materials. In the application of these rods and electrodes, the tube metal and its contents are deposited in the weld puddle during the deposition sequence. Welding rods and electrodes have also been produced by forming a coating or covering on a rod, and also by filling the core and coating the outside of a tube. In another type of build-up welding known as submerged-arc welding, a continuous consumable welding rod in the form of an electrode is used and a granular flux which can contain alloying elements is placed on the part to be welded. The arc melts some of the flux and is submerged in the liquid slag so produced.

Depending on the intended use of the machine part subject to wear, the suitable process for producing the wear-resistant coatings is selected. Thus, for example, thermal spray layers are not suited for impact stresses, electrolytic coatings can be effected only with a few elements or alloys, electrostatic coatings are possible only to a limited layer thickness and depositions from the vapor phase have only poor adhesion to the base material.

These difficulties do not occur in the build-up welding process and particularly not in the plasma welding process. Firstly, the diffusion bond in the flowing melt produces good adhesion and secondly welding in layers can produce wear-resistant layers of any desired thickness. Therefore, this process is applicable when machine parts are subjected to particularly unfavorable stresses, such as stresses formed by a high sliding speed of parts rubbing against one another under alternating loads, high thermal stresses, stresses formed as a result of a lack of lubrication and stresses formed because of the influence of corrosive media. Such machine elements are, for example, piston rings of internal-combustion engines, sealing strips for rotary piston engines, slide ring seals or running gear seals.

It is known to coat such machine parts with sprayed layers of, for example, the metals molybdenum, tungsten, niobium or tantalum. Such layers offer very good protection against wear during high temperature stresses, but they fail for other types of stresses. It is therefore obvious to produce such layers in a welding process. However, it has not been possible in the prior art to produce the layers so that they are useful for practical purposes. The previously produced layers are useless in practice because of their formation of coarse grains, welding cracks, pores and irregular structure in the application.

It is therefore a primary object of the present invention to provide a material which can be processed in a build-up welding process without the occurrence of the above-described drawbacks and which at the same time is resistant enough to wear to withstand the above-mentioned high stresses.

SUMMARY OF THE INVENTION

In accordance with the present invention, it has now been discovered that a welding powder comprising a first component selected from the group consisting of molybdenum powder, tungsten powder, and a mixture of molybdenum powder and tungsten powder and a second component of at least one element selected from the group consisting of oxygen, nitrogen, hydrogen and carbon can be used as the material for build-up welding and that this material produces excellent wear-resistant surfaces. The oxygen, nitrogen, hydrogen or carbon is present in the metal of the welding powder partly in an unbound, dissolved state.

DETAILED DESCRIPTION OF THE INVENTION

The welding powder of the present invention contains as an essential first component tungsten powder, molybdenum powder, a mixture or an alloy of tungsten powder and molybdenum powder. The amount of these elements in the welding powder is between about 50 to 100 percent by weight, preferably 80 to 95 percent by weight. When a mixture or an alloy of tungsten and molybdenum powders is used, the weight percent of each metal in the mixture may vary from 0 to 100, but it is preferred to use mixtures containing 50 to 100 weight percent molybdenum, with the remainder tungsten. The average particle size of the tungsten and molybdenum powders that are used in the welding powder of the present invention can be between about 40 to 200$\mu$m, preferably between about 60 to 75$\mu$m. The final welding powder with its various constituents also preferably has this average particle size.

There is intimate contact with noporosity between these constituents of the coating with another and with the surface of the base material.

When oxygen is present in the welding powder, the oxygen content of the welding powder is between about 0.001 and about 12 percent by weight, preferably 3.9 to 4.5 percent by weight, based on the weight of the welding powder. Generally, at least 1 weight percent of this oxygen is unbound, and the welding powder contains from about 0.0001 to about 0.12 weight percent, preferably 0.039 to 0.045 weight percent, unbound oxygen.

The oxygen is introduced into the welding powder by spraying the melted powder in an air stream and the desired amount of unbound, dissolved free oxygen is obtained in the welding powder by the partial pressure of the oxygen. The presence of free oxygen makes the welded layer harder.

When nitrogen is present in the welding powder, the nitrogen content of the welding powder is between about 0.001 and about 0.5 percent by weight, preferably 0.003 to 0.006 percent by weight, based on the weight of the welding powder. Generally, at least 1 weight percent of this nitrogen is unbound, and the welding powder contains from about 0.0001 to about 0.0005 weight percent, preferably 0.00003 to 0.0006 weight percent, unbound nitrogen.

The nitrogen is introduced into the welding powder by spraying the melted powder in a nitrogen atmosphere and the desired amount of unbound, dissolved free nitrogen is obtained in the welding powder by the pressure of the nitrogen. The presence of free nitrogen makes the welded layer harder.

When hydrogen is present in the welding powder, the hydrogen content of the welding powder is between about 0.001 and about 0.5 percent by weight, preferably 0.003 to 0.01 percent by weight, based on the weight of the welding powder. Generally, at least 1 weight percent of this hydrogen is unbound, and the welding powder contains from about 0.00001 to about 0.005 weight percent, preferably 0.00003 to 0.0001 weight percent, unbound hydrogen.

The hydrogen is introduced into the welding powder by spraying the melted powder in a hydrogen atmosphere and the desired amount of unbound, dissolved free hydrogen is obtained in the welding powder by the pressure of the hydrogen. The presence of free hydrogen makes the welded layer harder.

When carbon is present in the welding powder, the carbon content of the welding powder is between about 0.01 and about 2.5 percent by weight, preferably to 1.5 percent by weight, based on the weight of the welding powder. Generally, at least 30 weight percent of this carbon is unbound, and the welding powder contains from about 0.003 to about 0.8 weight percent, preferably 0.03 to 0.5 weight percent, unbound carbon. The carbon can be introduced into the welding powder as amorphous or graphitic carbon.

Carbon makes the layer harder and gives to it better lubrication properties.

Only one of the elements oxygen, nitrogen, hydrogen or carbon can be provided in the welding powder, or any combination of two or more of these elements can be provided, including all four elements. Preferably, when providing only one element, that element is oxygen; and when providing more than one element, the elements are oxygen and carbon.

The welding powder of the present invention can optionally contain copper or copper alloys, in an amount of about 0.01 to about 20 percent by weight, preferably 5 to 10 percent by weight.

The copper or copper alloy can be mixed or alloyed into the welding powder.

A suitable alloy which may be used is Cu Ti with a content of 6 percent by weight Titanium. Copper gives to the coating better lubrication properties.

The wear resistance of the weld layer or deposit formed by the welding powder can be significantly increased if one or more carbide forming materials comprising at least one material selected from the group consisting of titanium, tantalum, niobium, zirconium, chromium and vanadium is present in the welding powder. These carbide forming materials can be added to the welding powder as individual metallic elements or can be added in the form of alloys such as alloys with each other. The total amount of these carbide forming elements, either singly or in combination, which may be contained in the welding powder can be up to about 50 percent by weight of the welding powder, preferably 1.5 to 20 percent by weight. During the welding deposition process, the carbide forming elements are converted to carbides which contribute to the wear-resistance of the weld deposit. The carbon required for this carbide formation may be obtained from materials providing carbon. For example, iron carbide can be added to the welding powder to provide the necessary carbon for the carbide formation. Similarly, carbon can be added to the welding powder to provide the necessary carbon for carbide formation. Further, the base material of the build-up weld, that is the material which is protected by the weld deposit, can provide the necessary carbon for the carbide formation. For example, cast iron often is the base or parent material on which the weld deposit is formed, and this base material can provide the necessary carbon for the carbide formation.

In the case of welding such a layer to a base material containing no carbon, then carbon must initially be added to the powder mixture either in the form of fine graphite or carbon containing compounds. The content of carbon is preferably between 0.1 to 1.5 percent by weight.

The welding powder of the present invention can also contain a minor amount of boron, that is, in an amount of about 0.001 to about 20 percent by weight, preferably 0.5 to 4 percent by weight. The presence of boron in the welding powder results in unbound carbon being present in the build-up weld deposits and this unbound carbon provides the weld deposit with excellent dry operation or lubricity properties so that the welded product can be used in applications where no added lubricant or insufficient lubricant is provided.

As previously discussed, the welding powder of the present invention can be used to form weld deposits on cast iron which, of course, is a Fe containing material. The welding powder of the present invention can also be used to form weld deposits on non-ferrous materials.

Exemplary non-ferrous materials on which welded deposits can be formed include copper, nickel, titanium and their alloys.

For build-up welds which are not applied to Fe containing materials, it is preferable to add to the welding powder an appropriate proportion of iron or an iron alloy which would otherwise be found in the weld and derived from the Fe containing material. This addition of iron or an iron alloy insures that the weld will have the same good wear-resistance properties as they are described above. When adding iron or an iron alloy to the welding powder, the iron or iron alloy preferably should be added in an amount of between about 5 to about 10 weight percent. Typical iron alloys which can be added include ferrotungsten and ferro alloys of silicon, manganese, boron, molybdenum, zirconium and the like.

The welding powders, containing in the main molybdenum and tungsten are thoroughly mixed and deposited on the base material by a plasma arc welding process. Prior to the welding the free oxygen, the free nitrogen and the free hydrogen are introduced in the molybdenum and / or tungsten by spraying the powder into a chamber containing oxygen, nitrogen or hydrogen. The desired quantities of gas are controlled by the relevant partial pressure of the gases.

The following are examples of the proposed welding process:

EXAMPLE 1

90 percents by weight of Molybdenum with 1 percent by weight of oxygen
10 percent by weight of Titanium

EXAMPLE 80 percents by weight of Molybdenum with 1 percent by weight of oxygen
10 percents by weight of Titanium
10 percents by weight of Tungsten Carbide

EXAMPLE 3

70 percents by weight of Molybdenum with 1 percent by weight of oxygen
20 percents by weight of Iron Carbide
10 percents by weight of Copper — Titanium — alloy It will be understood that the above description of the present invention is susceptible to various modifications, changes and adaptations and the same are intended to be comprehended within the meaning and range of equivalents of the appended claims.

We claim:

1. A welding powder for producing wear-resistant layers by build-up welding, consisting essentially of:
   a. a first component selected from the group consisting of molybdenum powder, tungsten powder, an alloy of molybdenum and tungsten in powder form, and a mixture of molybdenum powder and tungsten powder; and
   b. a second component of at least one element selected from the group consisting of oxygen, nitrogen, hydrogen and carbon, said second component being present partly in a free, unbound, dissolved state; and
   when oxygen is present as the welding powder, it is present in an amount of about 0.001 to about 12 percent by weight, with the free oxygen content being from about 0.00001 to about 0.12 weight percent;
   when nitrogen is present in the welding powder, it is present in an amount of about 0.001 to about 0.5 percent by weight, with the free nitrogen content being from about 0.00001 to about 0.00005 weight percent;
   when hydrogen is present in the welding powder, it is present in an amount of about 0.001 to about 0.5 percent by weight, with the free hydrogen content being from about 0.00001 to about 0.005 weight percent; and
   when carbon is present in the welding powder, it is present in an amount of about 0.01 to about 2.5 percent by weight, with the free carbon content being from about 0.003 to about 0.8 weight percent.

2. The welding powder as defined in claim 1 wherein the welding powder contains 0.01 to 20 percent by weight copper or a copper alloy.

3. The welding powder as defined in claim 1, further containing at least one carbide forming element of titanium, tantalum, niobium, zirconium, chromium or vanadium, or alloys thereof.

4. The welding powder as defined in claim 3 wherein the sum of the content of the carbide forming elements is 50 percent by weight maximum.

5. The welding powder as defined in claim 1, further containing elementary boron.

6. The welding powder as defined in claim 5 wherein the boron content is from about 0.001 to about 20 percent by weight.

7. The welding powder as defined in claim 1, containing carbon dust.

8. The welding powder as defined in claim 7 wherein the carbon dust is soot or graphite dust.

9. The welding powder as defined in claim 1 and further containing iron carbide powder.

10. The welding powder as defined in claim 1 and further containing a minor amount of iron powder or a powder of an iron alloy.

11. The welding powder of claim 1 which contains carbon and oxygen as a second component.

12. The welding powder as defined in claim 1 which contains oxygen as a second component.

13. The welding powder as defined in claim 1 which contains oxygen, nitrogen, hydrogen and carbon as a second component.

* * * * *

UNITED STATES PATENT AND TRADEMARK OFFICE
CERTIFICATE OF CORRECTION

PATENT NO. : 3,890,137
DATED : June 17th, 1975
INVENTOR(S) : Horst Beyer et al

It is certified that error appears in the above-identified patent and that said Letters Patent are hereby corrected as shown below:

Column 2, line 63, change "noporosity" to --no porosity--.

Column 3, line 4, change "0.0001" to --0.00001--; line 19, change "0.0001" to --0.00001--; line 20, change "0.0005" to --0.005-- and change "0.0006" to --0.00006--; line 45, after "preferably" insert --0.1--.

Column 5, line 21, after "EXAMPLE" insert --2--.

Column 6, line 8, change "0.00005" to --0.005--.

Signed and Sealed this twenty-seventh Day of April 1976

[SEAL]

Attest:

RUTH C. MASON
Attesting Officer

C. MARSHALL DANN
Commissioner of Patents and Trademarks